Figure 1:
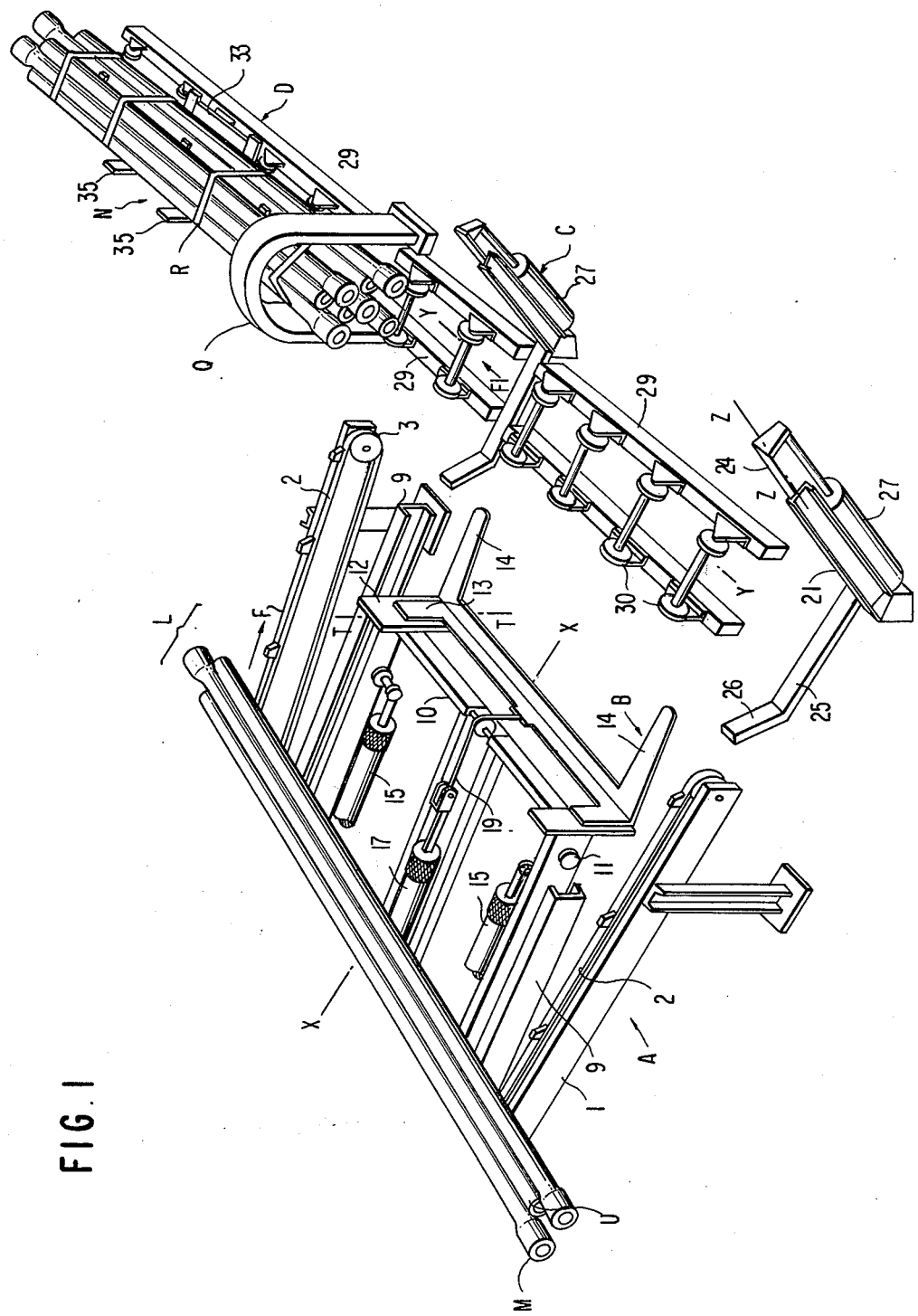
Figure 6:
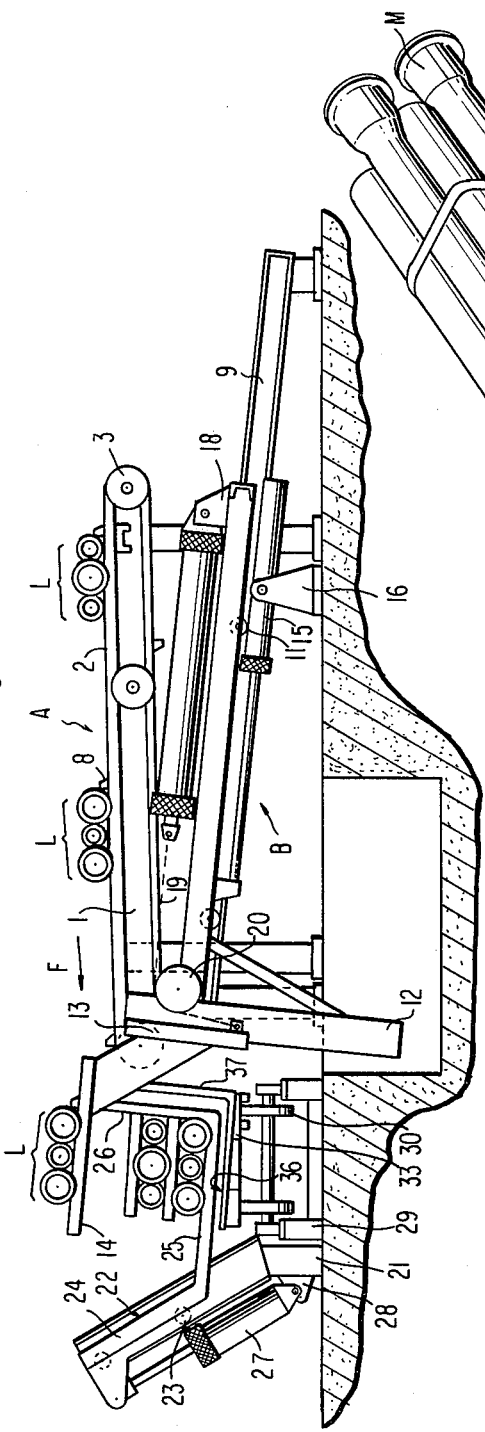

United States Patent [19]

Wright et al.

[11] 4,441,843
[45] Apr. 10, 1984

[54] ADJUSTABLE QUARTER-TURN FASTENER

[75] Inventors: Andrew C. W. Wright, Farnham; John W. Petruschke, Aldershot, both of England

[73] Assignee: Dzus Fastener Co., Inc., West Islip, N.Y.

[21] Appl. No.: 323,815

[22] Filed: Nov. 23, 1981

[51] Int. Cl.³ .............................................. F16B 21/02
[52] U.S. Cl. .................................................. 411/349
[58] Field of Search ..................... 411/349, 350, 347; 24/221 R, 221 A, 221 K

[56] References Cited

U.S. PATENT DOCUMENTS

| D. 255,772 | 7/1980 | Johnson et al. | 24/221 A X |
|---|---|---|---|
| 2,385,180 | 9/1945 | Allen | 24/221 K |
| 2,478,972 | 8/1949 | Luce | 411/347 X |
| 2,479,992 | 8/1949 | Woods | 24/221 K |
| 2,610,379 | 9/1952 | Bugg | 24/221 A |
| 2,640,244 | 6/1953 | Becker | 24/221 K |
| 2,640,245 | 6/1953 | Becker | 24/221 K |
| 3,124,993 | 3/1964 | Schlueter | 411/350 X |
| 3,360,910 | 1/1968 | Soltis | 411/350 X |

FOREIGN PATENT DOCUMENTS 822016 10/1959 United Kingdom ................ 411/554

Primary Examiner—Thomas J. Holko
Assistant Examiner—Adrian Whitcomb
Attorney, Agent, or Firm—Daniel H. Kane

[57] ABSTRACT

A quarter-turn fastener has a bolt having a head and a screw-threaded shank, and a retainer assembly threadably secured to the shank as a tight friction fit thereon. The retainer assembly has a pair of abutments for engagement with the rear of a support, through an aperture in which the retainer assembly locates in use. The retainer assembly includes at least one pair of stops for engagement with the sides of the aperture in the support or a corresponding aperture in a panel in which the fastener is mounted in use, to define the inoperative and operative positions of the retainer assembly. A compression spring is located in use between the retainer assembly and an opposed surface of the panel to retain the retainer assembly in its inoperative position under the action of friction, when the retainer assembly is disengaged from the support.

4 Claims, 10 Drawing Figures

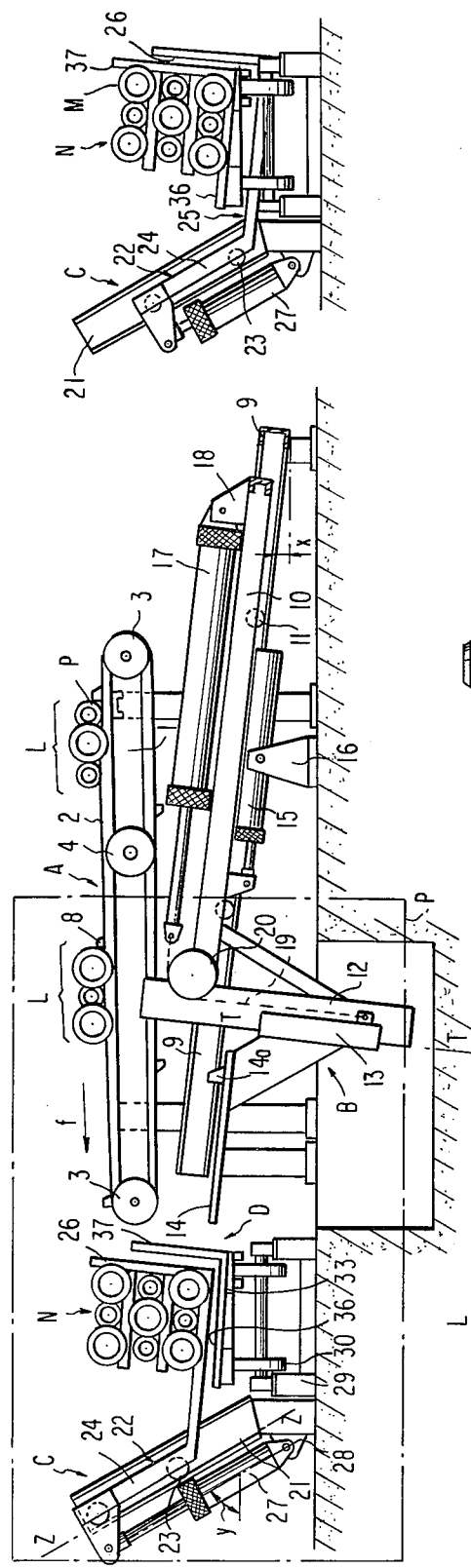
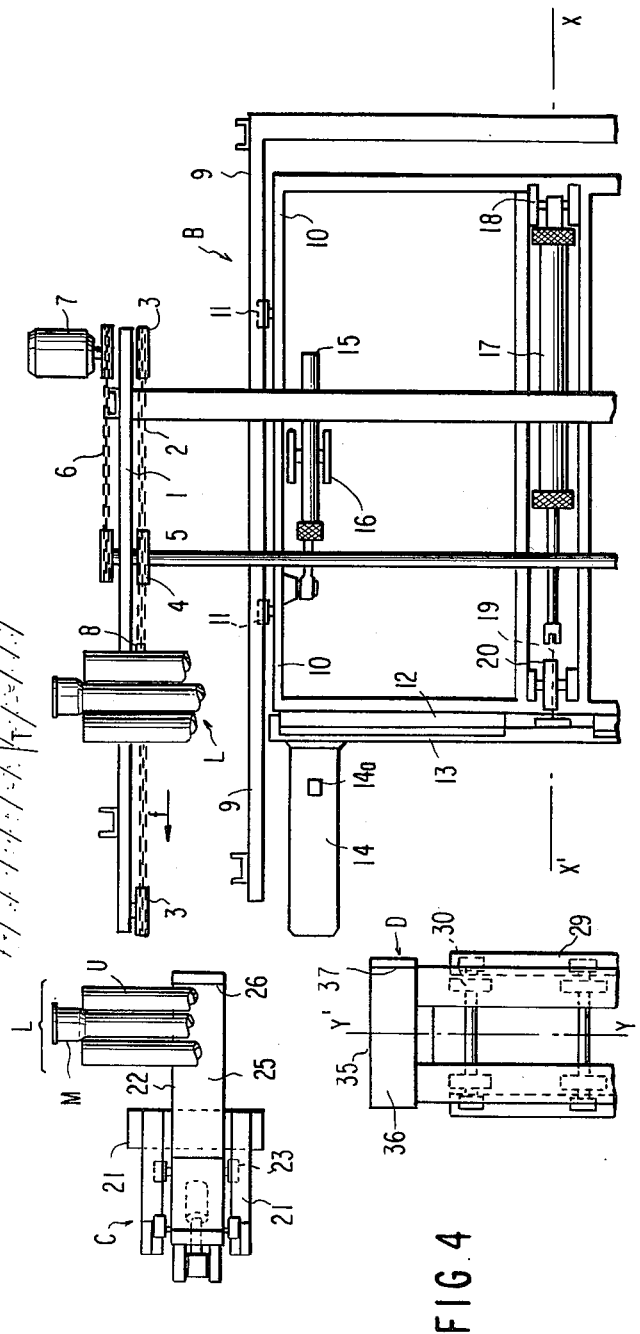

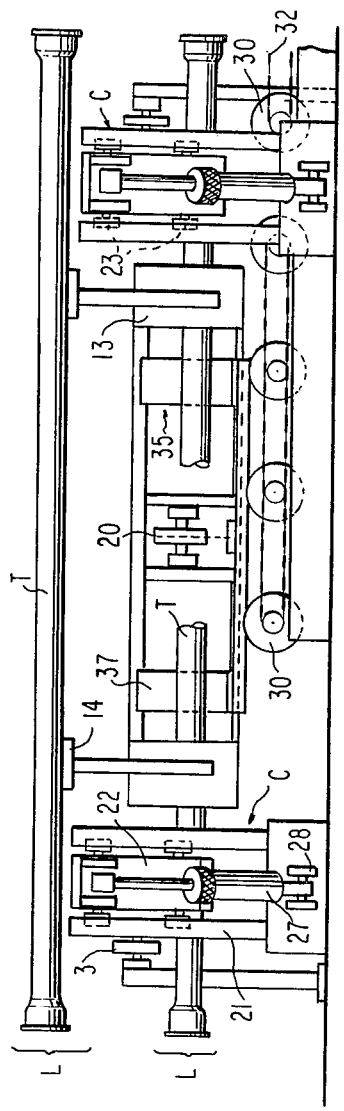
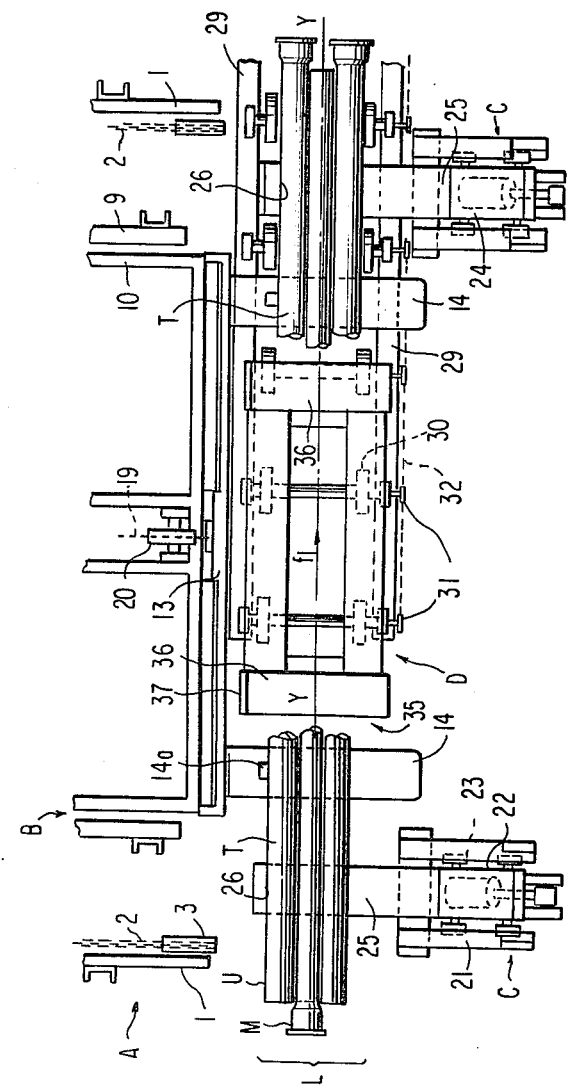
FIG. 7
FIG. 8

ADJUSTABLE QUARTER-TURN FASTENER

The present invention relates to quarter-turn fasteners such as are commonly used to retain, for example, the cover on a cabinet. More particularly, the invention relates to such a fastener which has the feature of adjustability to enable changes in the spacing between the support and the panel attached to it by the fastener, to be accommodated automatically by the fastener.

One simple prior art fastener of this type which is designed for attaching a single skin panel or cover to a support, comprising a screw-threaded bolt which passes through an aperture in the panel and a plastic retaining member which is screw threaded onto the free end of the bolt, but which is a very tight interference fit with the bolt so that it is generally held in a fixed position on the bolt for rotation with it. The plastic retaining member is spaced from the head of the bolt a sufficient distance to enable the support to be gripped between the rear face of the panel and the opposed faces of respective transversely extending shoulders on the retaining element. The support is provided with an elongate hole and the retaining member has a similar elongate cross-section so that it can be passed through the slot and then rotated through 90° so that its transversely extending shoulders grip the rear of the support. In order to ensure positive positioning of the retaining element when it is turned into the fastening position, at its end nearer to the head of the bolt, the retaining element is formed with an axially extending protrusion which has a generally lozenge-shaped cross-section. Opposed side faces of the protrusion are arranged to lie substantially at 90° to one another and the protrusion is of a thickness corresponding approximately with that of the support. The side faces of the protrusion effectively limit rotation of the retaining element to 90°, adjacent side faces coming into engagement with the sides of the elongate aperture to define the inoperative and fastening positions.

If, for example, a gasket is interposed between the panel and the support then during the life of the fastener the thickness of the gasket may shrink slightly and this reduction in thickness will require to be taken up by the fastener. This is achieved by virtue of the threading of the retaining element on the bolt, so that when the fastener is rotated into the fastened position and is held therein, the side faces of the protrusion on the retaining element engaging the sides of the slot in the support, a slight further rotation of the bolt can take place without further rotation of the retaining element, thereby drawing the bolt further into the retaining element and lessening the distance between the retaining element and the head of the bolt and thus accommodating for wear or shrinkage in the gasket.

Unfortunately, while such fasteners are capable of use in many applications, where there is a requirement for greater locking strength between the panel and the support a plastic retaining member has to be of unacceptably large dimensions in order to have the required strength characteristics. Furthermore, of course, there is significant freedom of movement of the bolt within the aperture in the panel once the panel has been removed from the support and the fastener is also, of course, easily rotated by vibration, so that when the panel is re-presented to the support the retaining element can be pinched between the panel and the support in a position in which it cannot pass through the elongate aperture in the support and, being pinched, the friction may be such as to prevent rotation of the retaining element on rotation of the head of the bolt, requiring the panel to be removed and all the fasteners used on the panel properly aligned before any of them is actually rotated into the fastened or operative position.

In accordance with the present invention a quarter-turn fastener comprises a bolt having a head and a screw-threaded shank, a retainer element or assembly threadably secured to the shank as a tight friction fit thereon, the retainer element or assembly having a pair of abutments for engagement with the rear of a support, through an aperture in which the retainer element or assembly locates in use, the retainer element or assembly including at least one pair of stops for engagement with the sides of the aperture in the support or a corresponding aperture in the panel through which the fastener is mounted in use, to define the inoperative and operative positions of the retainer element or assembly, and a compression spring located in use between the retainer element or assembly and an opposed surface of the panel to retain the retainer element or assembly in its inoperative position, under the action of friction, when the retainer element or assembly is disengaged from the support.

The compression spring thus holds the retainer element or assembly under the action of friction in the inoperative position when it is disengaged from the support so that when the panel is re-presented to the support the retainer element is in the correct position to pass through the aperture in the support to avoid it being pinched between the support and the panel.

Preferably, the end of the retainer element or assembly remote from the head of the bolt has a form which tends to rotate the fastener into the inoperative position when the retainer element is presented to the aperture in the support and it is not already orientated so as to pass through the aperture.

Preferably, the fastener is designed for use with a panel comprising a pair of skins, and the stops on the retainer element or assembly are arranged to engage with an aperture in a first of the skins lying adjacent the support, and the compression spring is a coil spring extending from the end of the retainer element adjacent the head of the bolt to the underside of the second skin on the opposite side of which is located the head of the bolt. Alternatively, if the fastener is to be used on a panel having only a single skin the compression spring may be in the form of a spiral compression spring located between the underside of the panel surface and the adjacent end of the retainer element or assembly and the stops on the retainer element or assembly may either cooperate with the aperture in the panel or with the aperture in the support.

A gasket may be interposed between the panel and the support. Initial rotation of the bolt causes the retainer element to move into the operative or fastening position automatically setting the retainer element in the correct position on the bolt, eliminating problems associated with panel thickness variation. In use, if the gasket reduces in thickness, then further rotation of the bolt after the retainer element has moved into the operative position causes the bolt to move further through the retainer element thereby preventing any slackness in the fastening of the panel to the support and accommodating the reduction in thickness of the gasket.

Preferably, the retainer element or assembly comprises a bush which is a sliding fit on the shank of the bolt, the bush having a counterbore receiving a nut non-rotatable therewithin, the nut being retained permanently within the counterbore and the nut having a suitably deformed screw-thread providing a tight friction fit with the screw-thread on the shank of the bolt, the abutments and stops being located on the bush.

Advantageously, the screw-threaded nut is relatively movable along the counterbore against the action of a compression spring within the counterbore, so that the bush is movable towards the head of the bolt. By this means, changes in the thickness of the gasket can be compensated for even when the fastener is out of use and thinning of the gasket is taking place whilst the panel is retained on the support.

An abutment may be formed at the end of the shank of the bolt remote from the head to prevent accidental unthreading of the retainer assembly from the bolt. The abutment may be formed by a conventional self-locking or plastic nut.

The nut may comprise a conventional self-locking nut or may be a plastic nut. Preferably the retainer element is a metal die casting and the nut is retained within the counterbore by swaging over the end of the counterbore.

As an alternative or in addition to locating a compression spring within the retainer element or assembly a similar compression spring may be mounted underneath the head of the bolt between the head of the bolt and the front surface of the panel.

The retainer element or assembly may be formed, respectively, as an integral die-casting or as a plastic bush retaining, with a snap or push-fit, a transverse element providing the abutments for engagement with the rear of the support.

Figure 2:
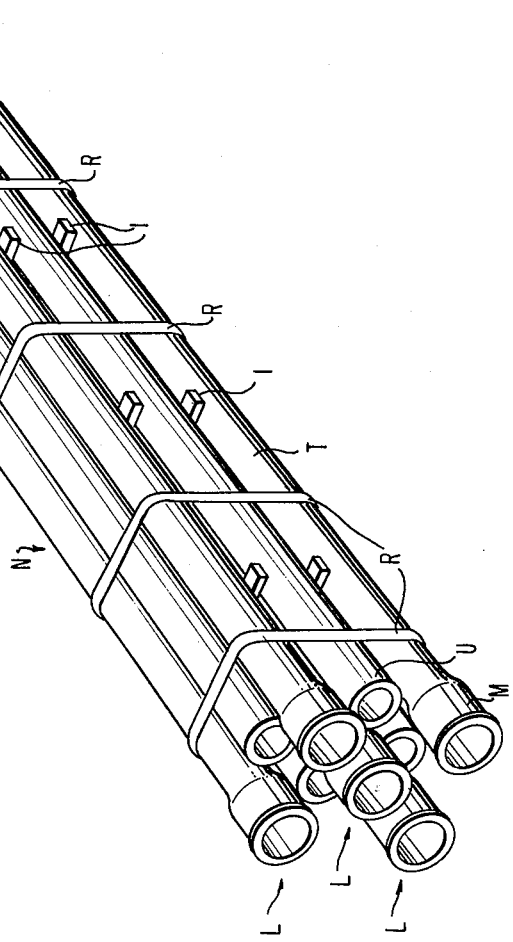
Figure 9:
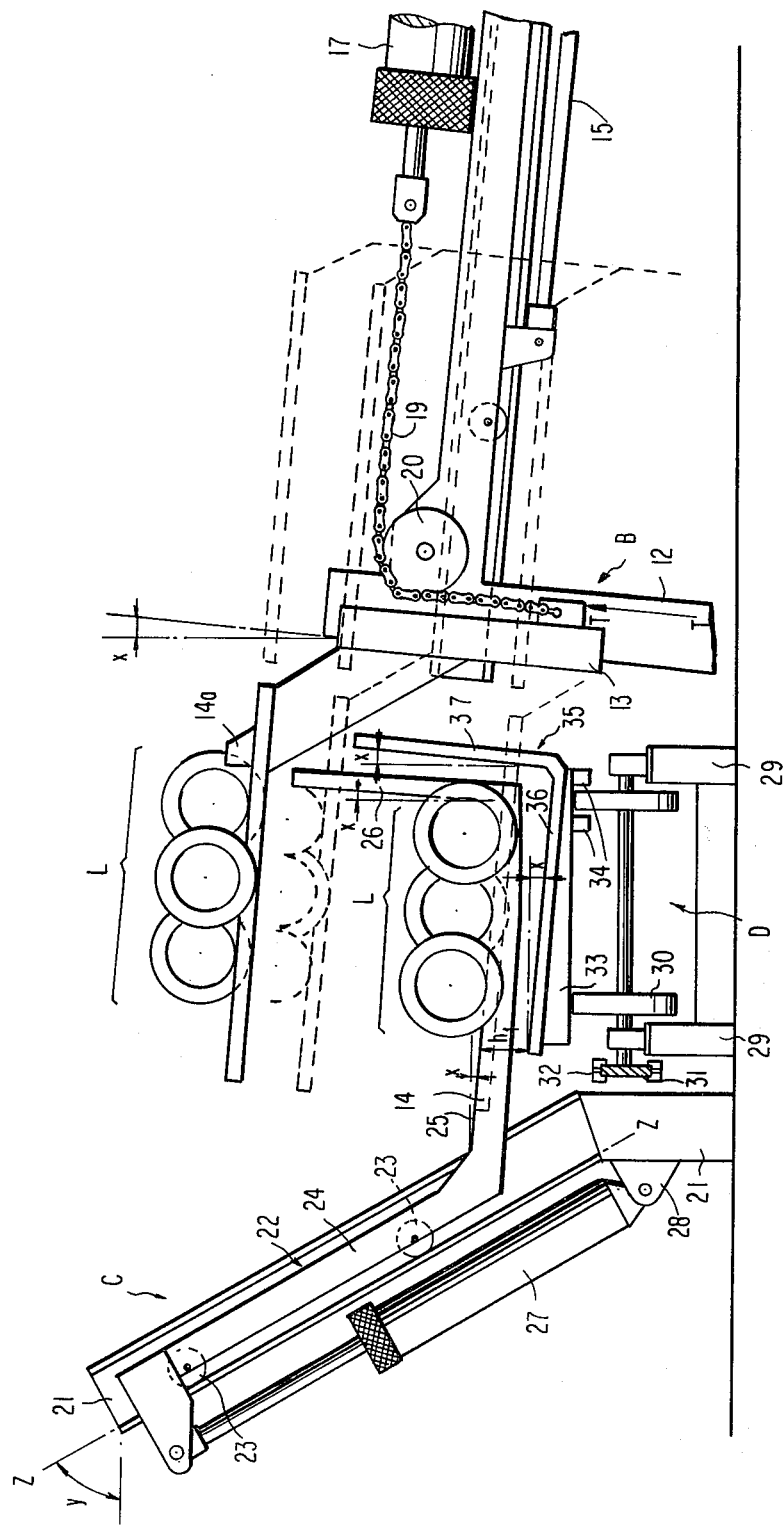
Figure 11:
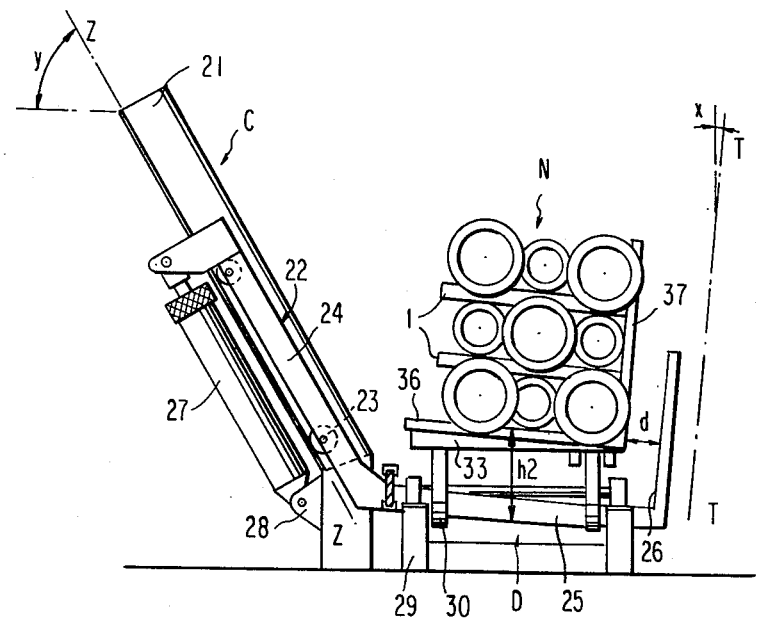
Figure 10:
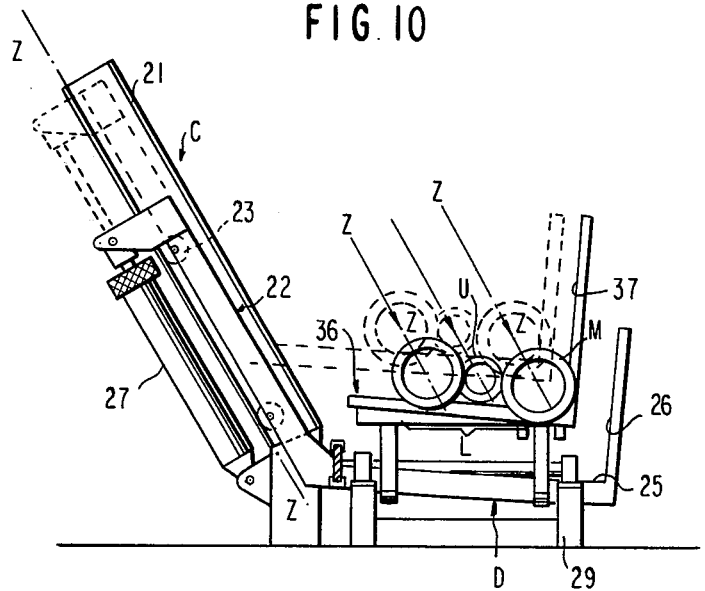
Figure 1A:
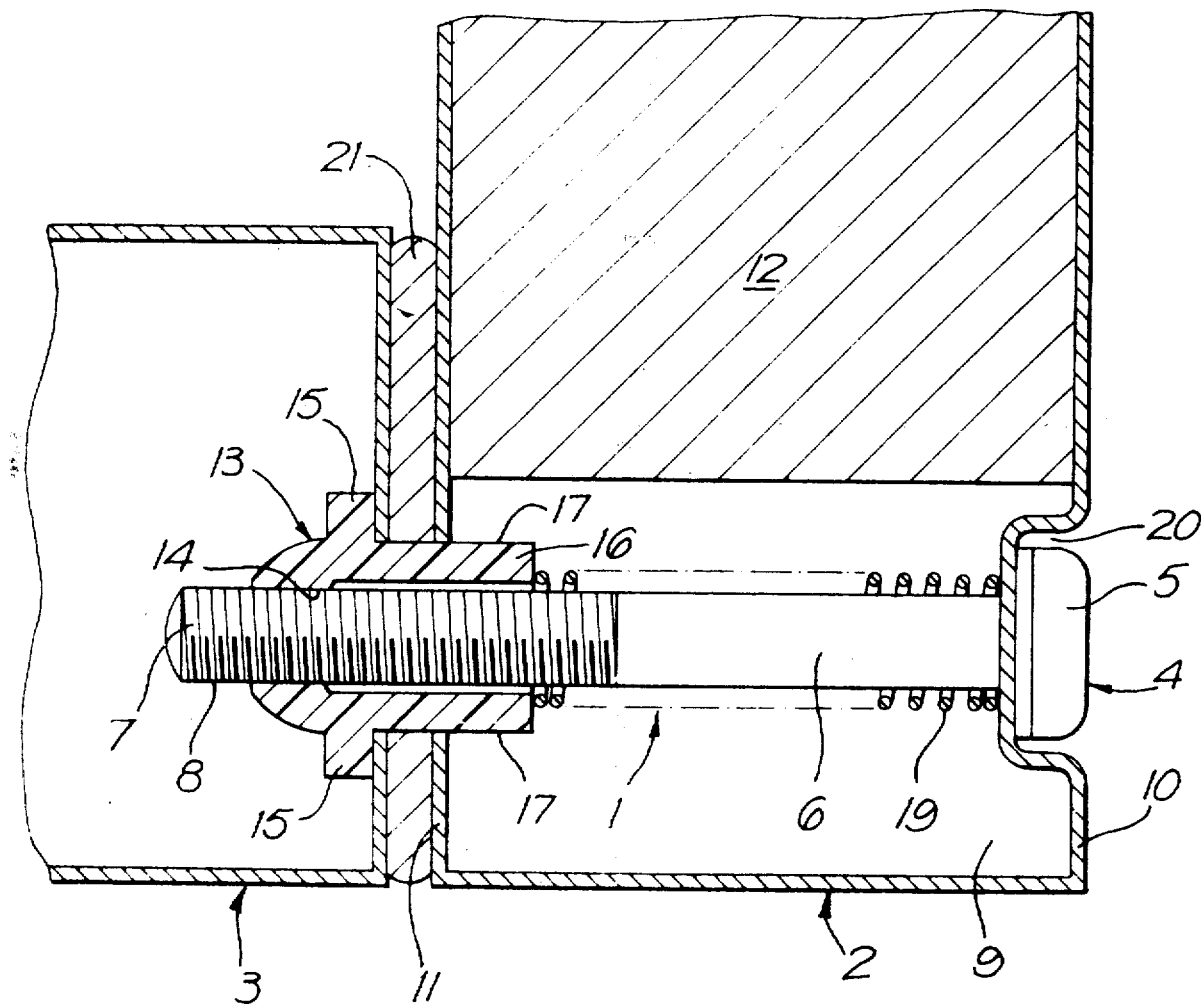
Figure 1B:
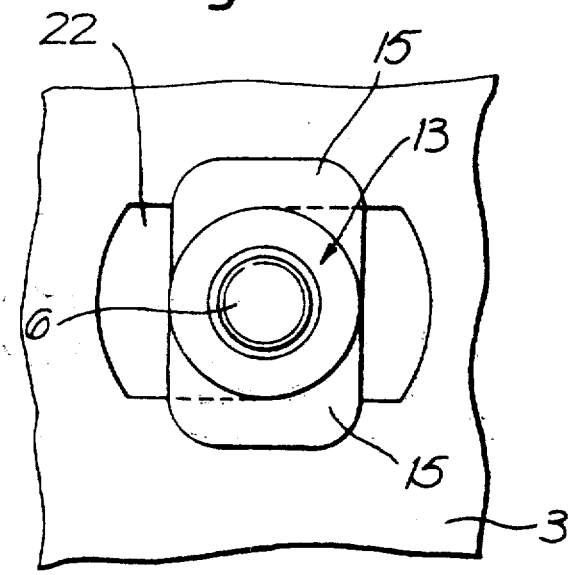
Figure 2:
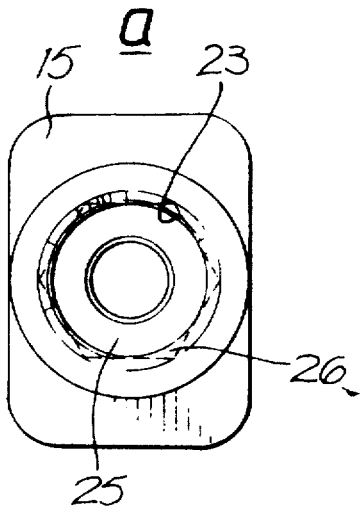
Figure 2:
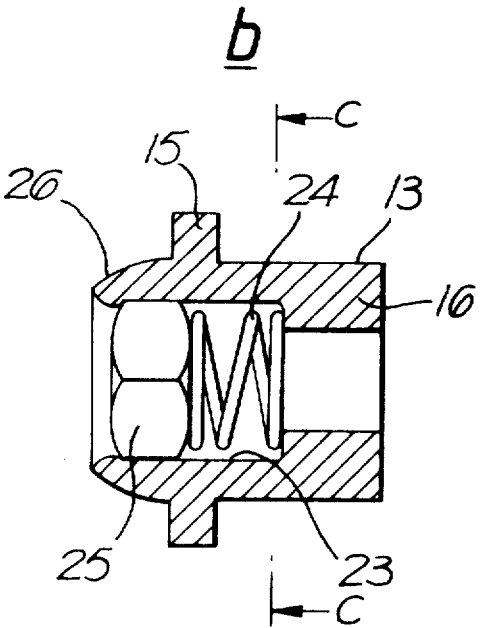
Figure 2:
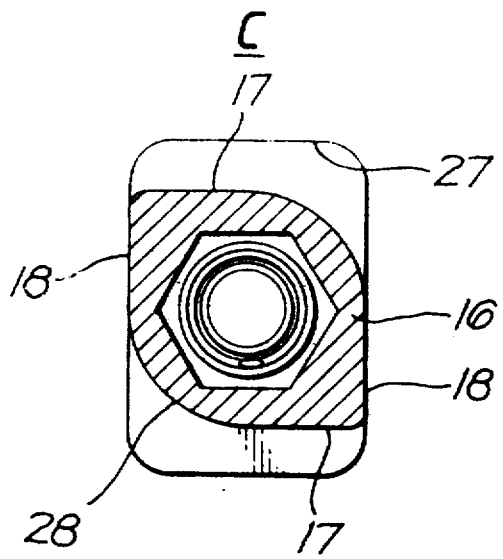
Figure 2:
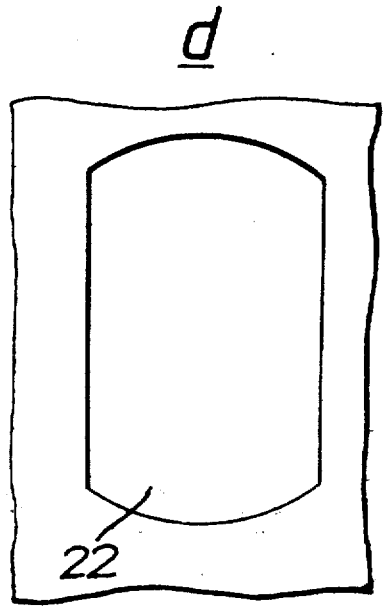
Figure 3A:
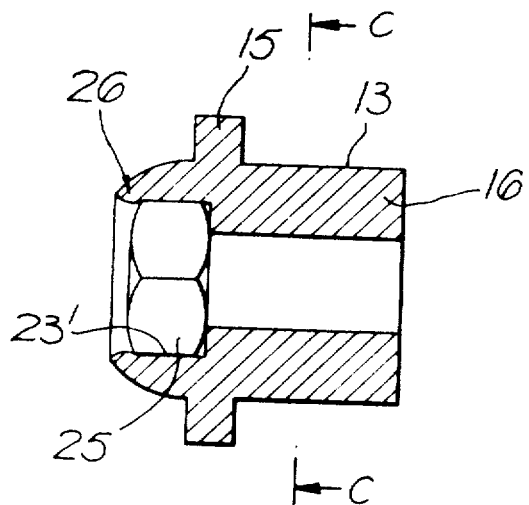
Figure 3B:
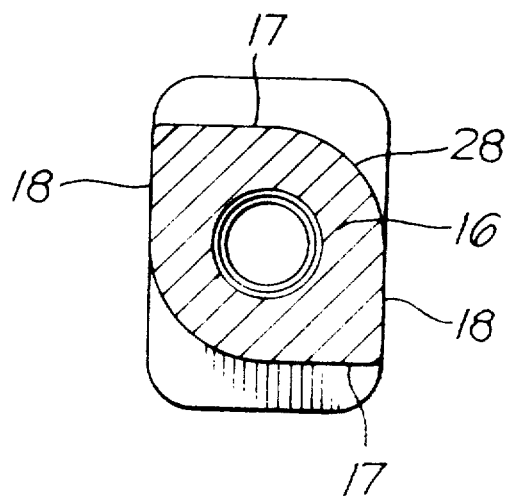
Figure 4:
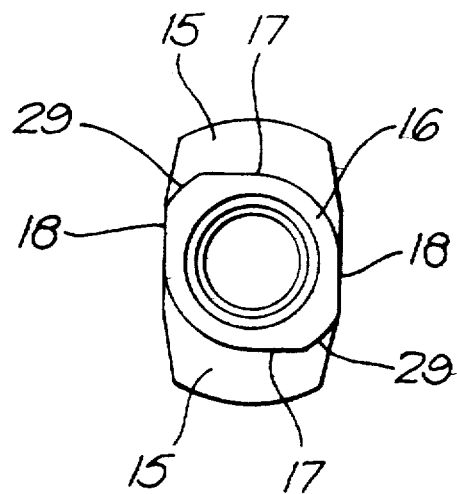
Figure 5:
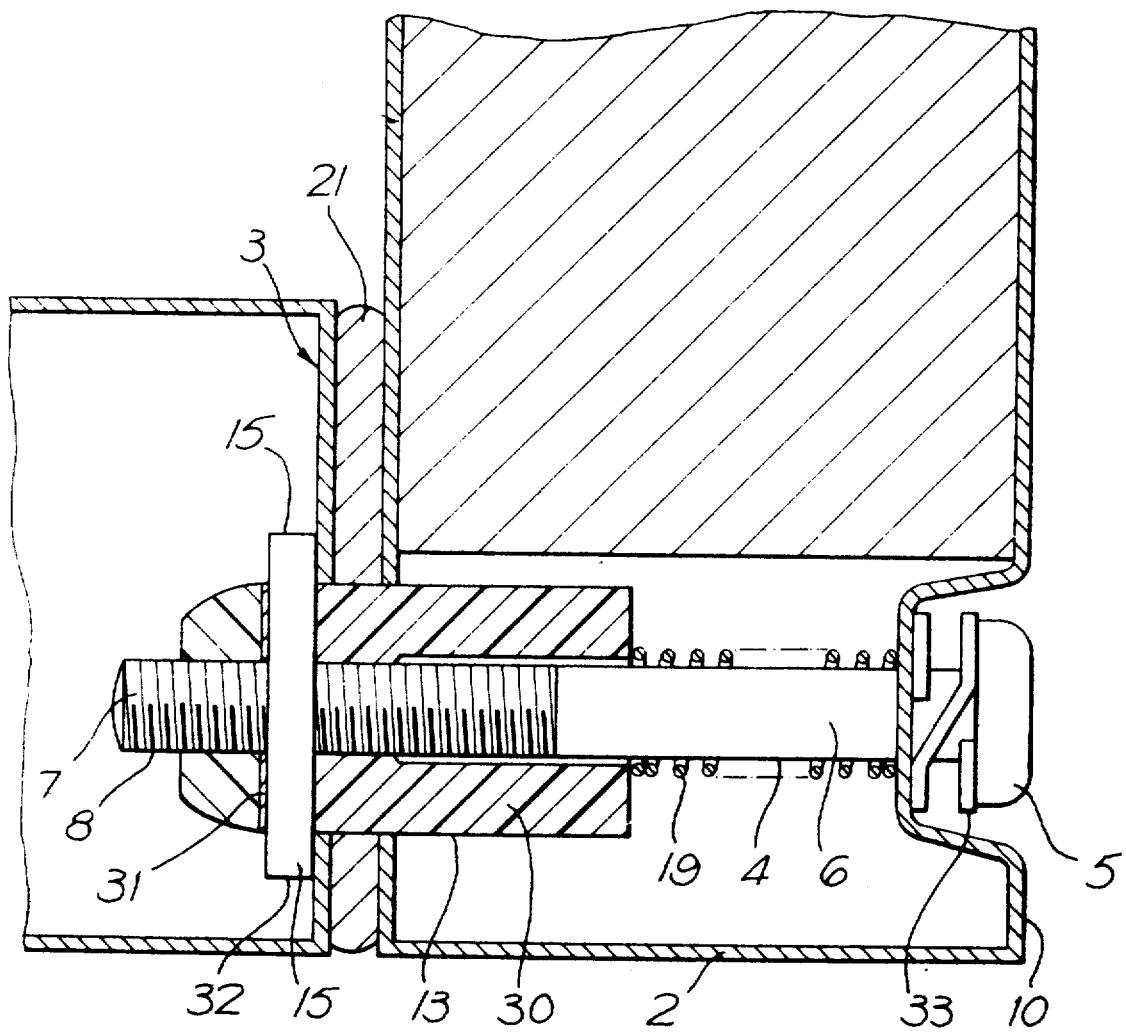
Figure 1A:
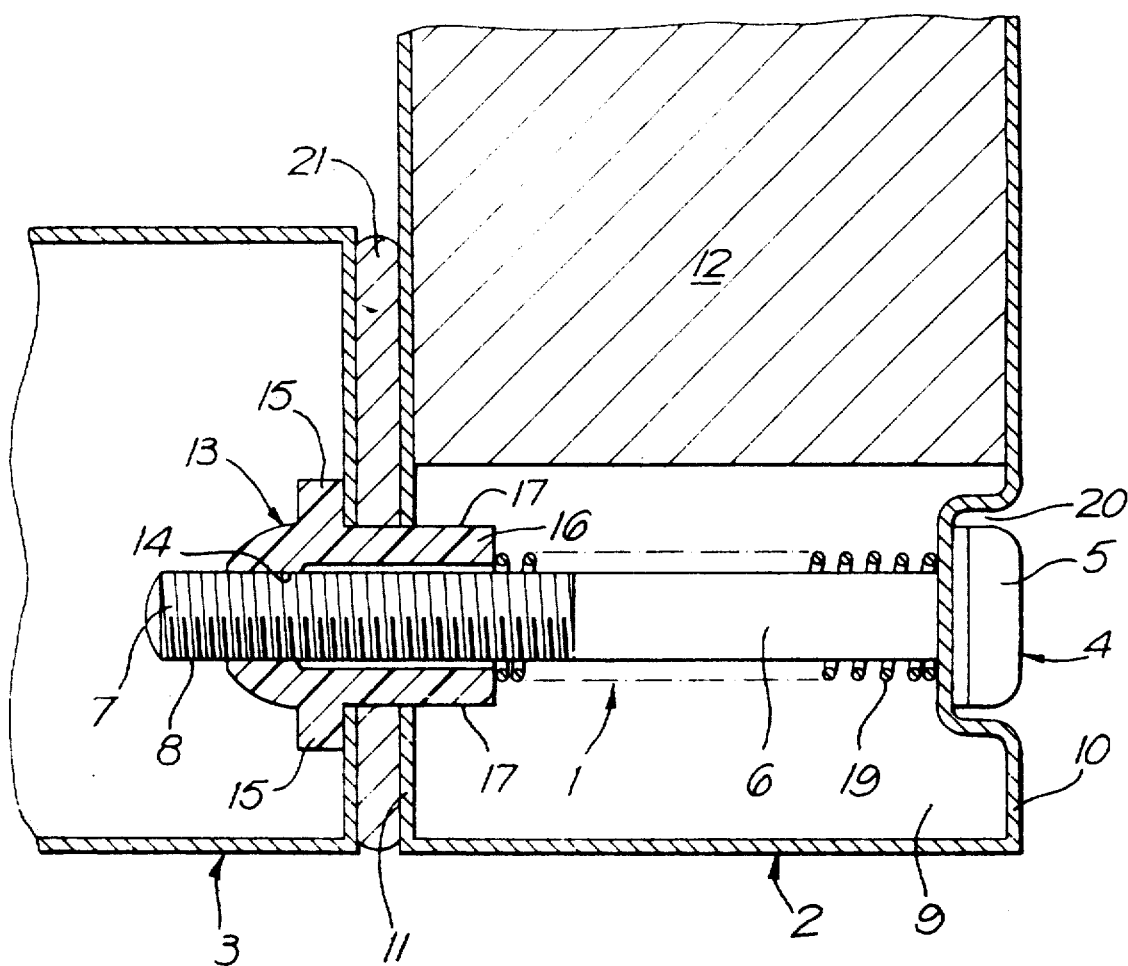
Figure 1B:
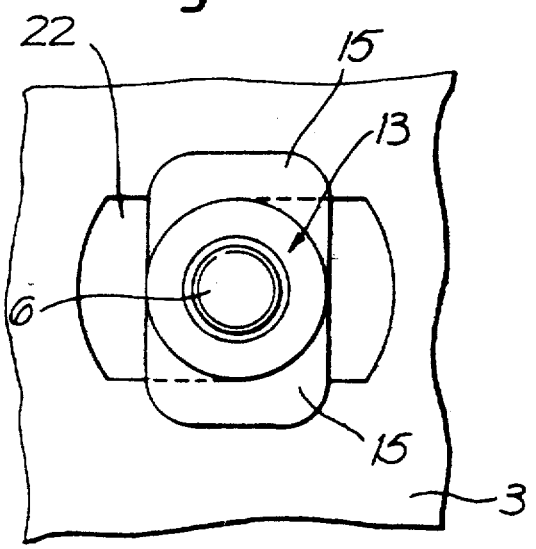
Figure 2:
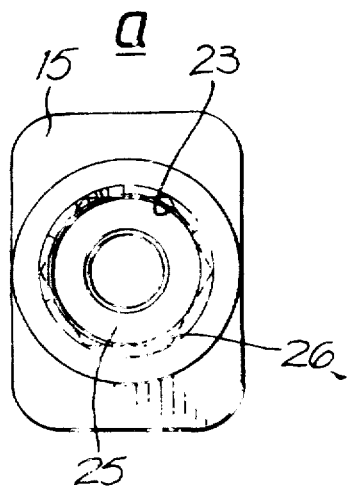
Figure 2:
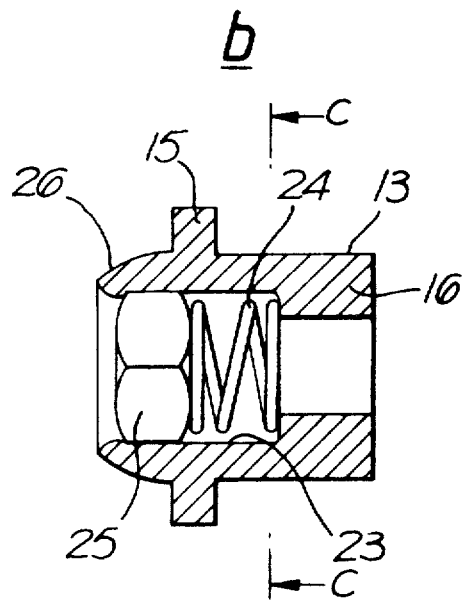
Figure 2:
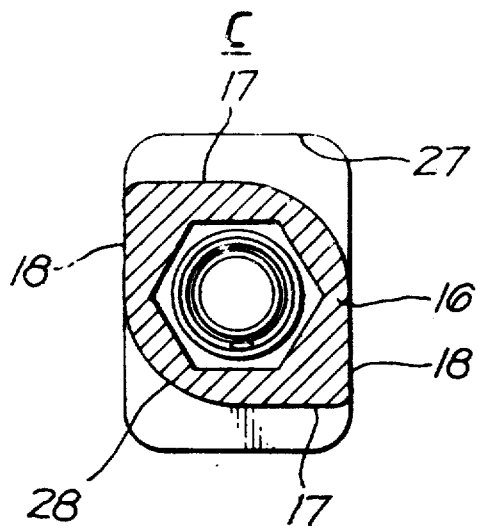
Figure 2:
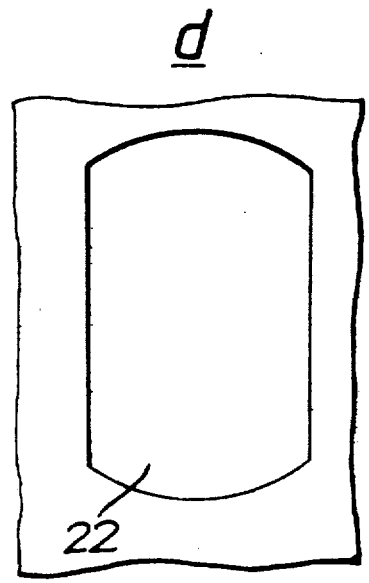
Figure 3A:
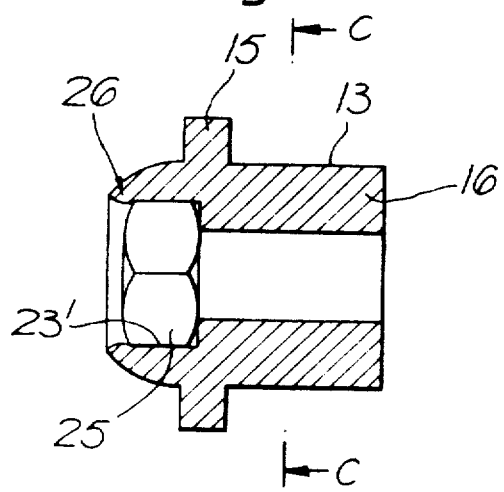
Figure 3B:
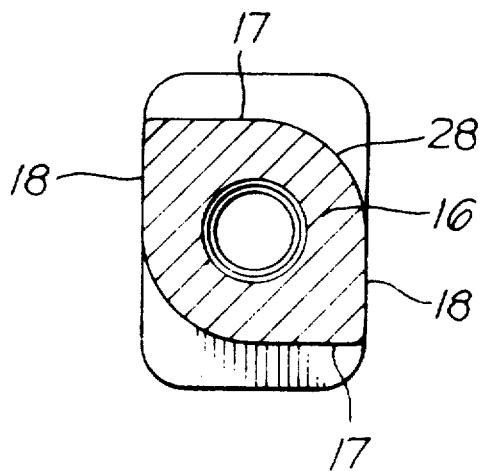
Figure 4:
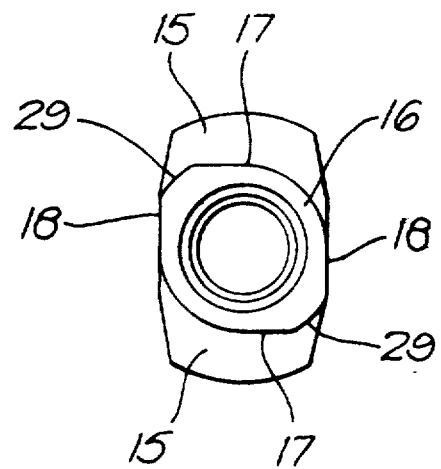
Figure 5:
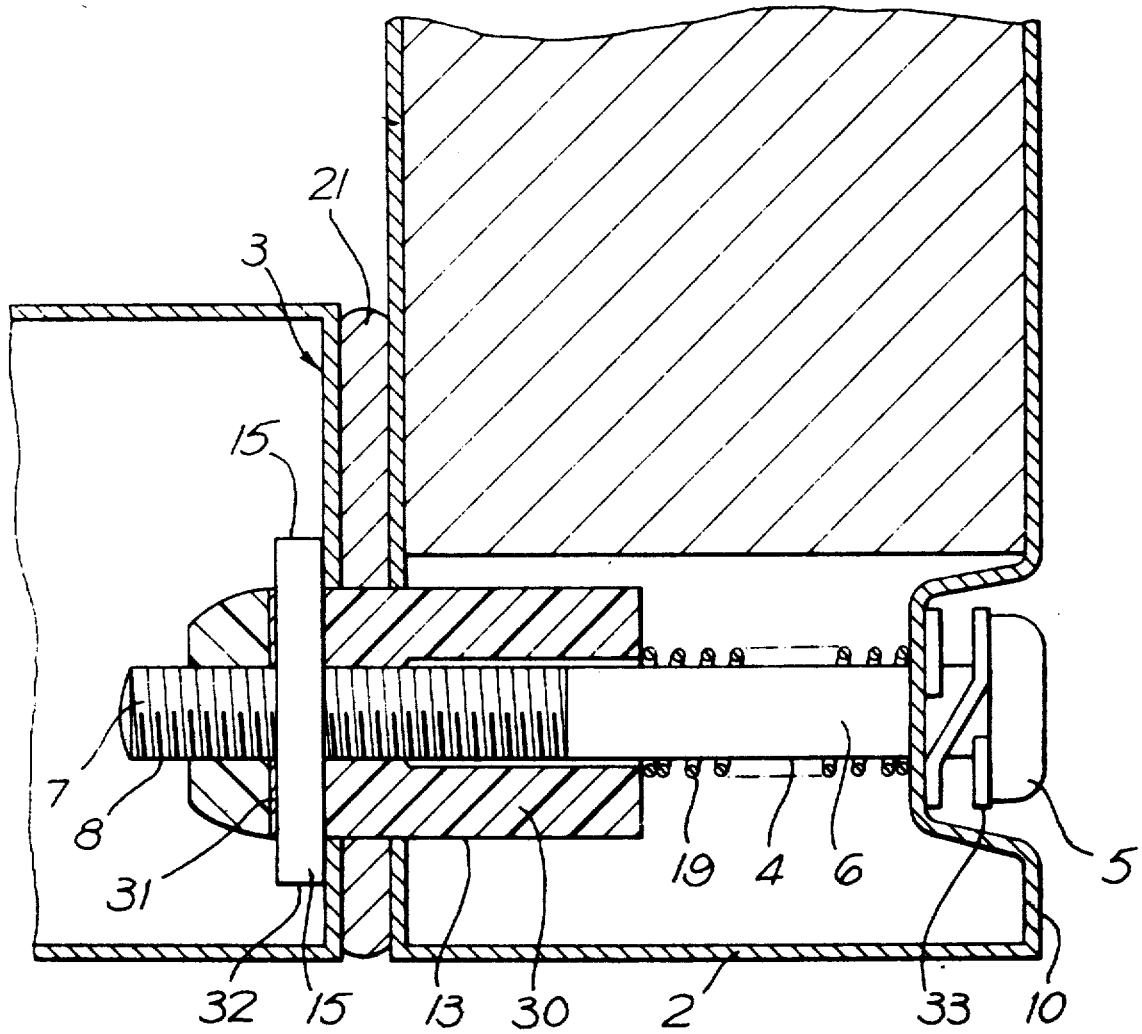

Examples of fasteners constructed in accordance with the present invention will now be described with reference to the accompanying drawings in which:

FIGS. 1a and 1b are an axial section and a cross-section through a first fastener;

FIGS. 2a, b, c and d are views of a second type of retainer assembly and the apertures through which it passes;

FIGS. 3a, and b, are views of a third retainer assembly and the apertures through which it is located;

FIG. 4 is a cross section through a modified retainer assembly according to FIGS. 2 or 3 and FIG. 5 is an axial section through a further type of fastener according to the invention.

As can be best seen from FIG. 1a a fastener 1, which is used to mount a double-skinned panel 2 to a support frame 3, has a bolt 4 which has a head 5 and a shank 6 which has an end portion 7 which is screw-threaded as shown at 8. The end of the shank adjacent the head of the bolt is un-threaded. The bolt extends through a circular aperture of slightly larger diameter than that of the shank 6 of the bolt 5 and through a space 9 between the two skins 10 and 11 of the panel 2. The skins 10 and 11 are spaced apart by a filler material 12. Onto the threaded end 7 of the shank 6 is located a die-cast metal retainer element 13 which has an internally threaded bore slightly larger than the threaded part 7 of the shank 6 and between the two is provided what is known as a "helicoil", that is to say a helical wire coil which acts to provide a threaded connection between the threads 8 on the shank 6 and the internal bore 14 in the retainer element 13. The helicoil is not shown. However, the helicoil provides a sufficiently tight frictional fit between the element 13 and the shank 6 that the retainer element is rotatable with the bolt unless it is prevented from rotation by abutment.

The element 13 has a pair of transverse shoulders or abutments 15 and a part 16 which has a generally lozenge-shaped cross section such as can be seen in FIG. 4, to provide stops 17 and 18 which limit the rotational movement of the element 13 between the operative and inoperative positions through an angle of 90°, the surfaces 17 and 18 being substantially at 90° to one another.

Between the front skin 10 of the panel 2 and the adjacent end of the element 13 there is disposed an elongate helical compression spring 19 which serves to bias the head of the bolt into the recess 20 formed in the front skin 10 so as to bias the retaining element 13 into the leftward position shown in FIG. 1a. In use, a gasket 21 is interposed between the panel 2 and the frame 3 and to fasten the panel to the frame the retaining element 13 is inserted through the aperture 22 in the frame in the position at 90° to that shown in FIG. 1b so that the shoulders 15 can pass through the aperture and can then be rotated, by rotation of the head 5 of the bolt 4 into the position shown in FIGS. 1a and b. If the gasket reduces in thickness over a period of time, perhaps due to frequent removal and reattachment of the panel, the firm fixing of the panel to the frame can be maintained by slight over rotation of the bolt head 5 once the operative position of the fastener has been achieved. By such over-rotation the screw threaded connection between the retainer element 13 and the shank 6, acting by means of the helicoil, causes the shank of the bolt to move further through the retainer element thus lessening the distance between the shoulders 15 and the head of the bolt and thus reducing the gap between the panel and the frame.

In a first alternative construction for the retaining element 13, there is shown in FIG. 2 an example in which the retaining element comprises a die-cast bush having a counterbore 23 of hexagonal cross-section. The counterbore receives a helical coil spring 24 and a plastic retaining nut 25 which has an internal screw thread adapted to provide a tight friction fit with the screw thread 8 on the shank 6 of the bolt. In order to retain the hexagonal nut and springs in the counterbore 23 the opening of the counterbore is swaged as shown at 26.

The retainer element 13 includes the other features of that of the FIG. 1 example, including the lozenge cross-sectioned portion 16 which provides stop surfaces 17 and 18 which engage with the sides of the aperture 27 in the inner skin 11 of the panel 2 to define the inoperative and operative positions of rotation of the retaining element. In order to accommodate for reducing thickness of the gasket 21 even when the panel remains in place on the frame, the spring 24 is arranged to be pre-stressed when the fastener is first operated, by over-rotating the head of the bolt so that after the retaining element 13 has been moved into the operative position the nut 25 moves, by action of its threaded cooperation with the shank of the bolt, towards the head of the bolt thus compressing the spring 24. Then, if the gasket 21 shrinks in use, the spring automatically allows for the reduction in gap between the panel and the supporting frame to prevent the panel from becoming loose.

In FIG. 3 there is shown a modified retainer assembly 13, in which a similar nut 25 is retained within a counterbore 23' which has a shorter axial length, there being no spring and the nut being constrained to prevent relative axial movement between the nut and the retaining element.

It can be seen that there is a difference between the shape of the part 16 of the retaining element 13 which provides the stops 17 and 18 between FIG. 4 and FIGS. 2 and 3. In FIGS. 2 and 3 the cross-section is substantially lozenge-shaped, the surfaces 17 and 18 meeting at a point and those on the same side of the central axis being connected by an arcuate portion 28. However, in FIG. 4, the corner between adjacent stops 17 and 18 has been removed, being replaced by a curved portion 29. Removal of the corner facilitates rotation of the retaining element 13 within the aperture 27 in the inner skin 11 of the panel 2.

In FIG. 5 there is shown a further fastener with a modified retainer assembly 13 which comprises a plastics sleeve 30 having an internal smooth bore into which the thread 8 self taps to provide a tight friction fit on the end portion 7 of the shank 6 of the bolt 4, the plastics sleeve 30 having a transverse slot 31 through which is fitted a metal plate 32 which provides the shoulders 15 for engaging the rear surface of the support 3.

A further modification which is present in this example and which has a substantially similar effect to the spring 24 provided in the retaining assembly 13 shown in FIG. 2, comprises a spring 33 of substantially helical form located beneath the head 5 of the bolt 4, between the head and the front skin 10 of the panel 2. The spring not only accommodates a reduction in thickness of the gasket 21 whilst the fastener is in the engaged position, but also serves to provide an indication of this reduction in thickness by biasing the head of the bolt outwardly from the front surface of the panel so that inspection of the fastener will reveal the reducing thickness of the gasket.

In other respects, the fastener shown in FIG. 5 is the same as that shown in the remaining examples and the method of operation is identical.

Although, in all the examples, the part 16 has been shown as cooperating with the aperture 27 in the inner skin 11 of the panel, it may be possible for the part 16, that is to say the stop surfaces 17 and 18 to cooperate with the aperture 22 in the support. However, it is preferred that the surfaces 17 and 18 cooperate with the aperture in the panel as this provides a closer fit of the fastener in the panel and enables a greater latitude in the relative alignment between the panel and support than is possible if the surfaces 17 and 18 require to cooperate with the aperture in the support, as the aperture in the support can be formed with larger tolerances. If the panel is of a single skin construction then the relative axial lengths of the bolt and retainer assembly or element will be correspondingly reduced and the spring 19 shown in FIG. 1, can be replaced by a spiral compression spring located between the single skin of the panel and the retainer assembly or element 13.

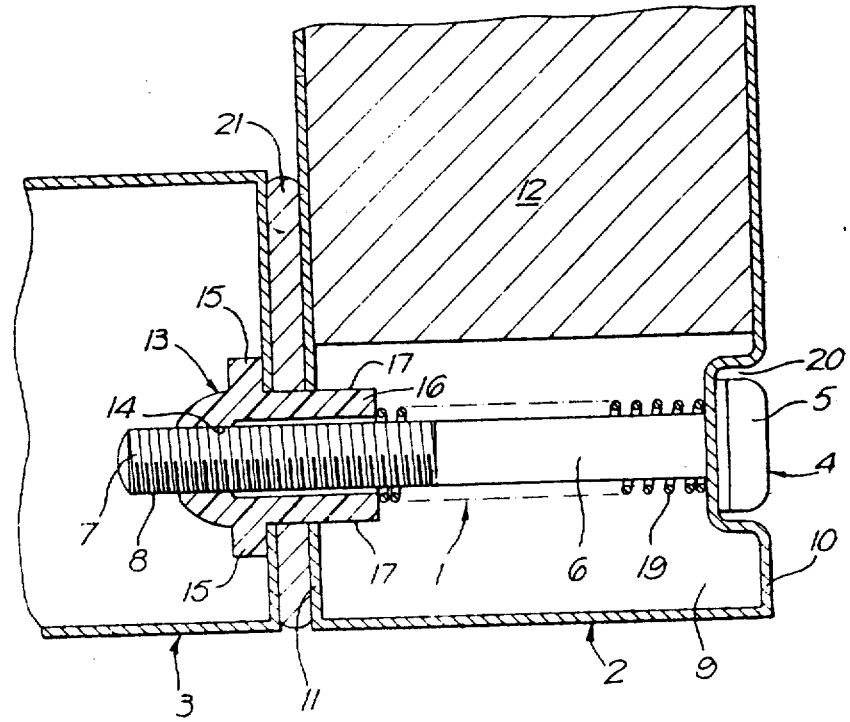

We claim:

1. A quarter-turn fastener for fastening a panel to a support, said fastener comprising a bolt, the bolt having a head and a screw-threaded shank; a retainer assembly including a bush having a sliding fit on said shank with a counterbore formed therein and having a nut permanently and non-rotatably retained in said counterbore with a tight frictional screw fit with the screw-threaded shank; a pair of abutments on said bush for engaging the rear of said support, said support having an aperture in which said bush locates; at least one pair of stops on said bush for engagement with the sides of said aperture in said support or a corresponding aperture in said panel to define inoperative and operative positions of said retainer assembly, wherein a compression spring is located between said retainer assembly and said panel to retain said retainer assembly in said inoperative position on said panel, under the action of friction, when said retainer assembly is disengaged from said support.

2. A fastener according to claim 1, further including a compression spring located around said shank of said bolt within said bush; a shoulder in the counterbore, said spring being located between said shoulder and the side of said nut nearest said head of said bolt.

3. A fastener according to claim 1, wherein said nut comprises a self-locking nut.

4. A fastener according to claim 1, wherein said nut is a plastic nut.

* * * * *

UNITED STATES PATENT AND TRADEMARK OFFICE
CERTIFICATE OF CORRECTION

PATENT NO. : 4,441,843

DATED : April 10, 1984

INVENTOR(S) : Andrew C. Wright et al

Page 1 of 6

It is certified that error appears in the above-identified patent and that said Letters Patent is hereby corrected as shown below:

The title page should be deleted to appear as per attached title page.

Cancel Figs. 1-10 and substitute Figs. 1-10 as per attached sheets.

Signed and Sealed this

Ninth Day of April 1985

[SEAL]

*Attest:*

DONALD J. QUIGG

*Attesting Officer*     *Acting Commissioner of Patents and Trademarks*

United States Patent [19]

Wright et al.

[11] 4,441,843
[45] Apr. 10, 1984

[54] ADJUSTABLE QUARTER-TURN FASTENER

[75] Inventors: Andrew C. W. Wright, Farnham; John W. Petruschke, Aldershot, both of England

[73] Assignee: Dzus Fastener Co., Inc., West Islip, N.Y.

[21] Appl. No.: 323,815

[22] Filed: Nov. 23, 1981

[51] Int. Cl.³ .............................. F16B 21/02
[52] U.S. Cl. .................................. 411/349
[58] Field of Search ............ 411/349, 350, 347; 24/221 R, 221 A, 221 K

[56] References Cited

U.S. PATENT DOCUMENTS

| D. 255,772 | 7/1980 | Johnson et al. | 24/221 A X |
| 2,385,180 | 9/1945 | Allen | 24/221 K |
| 2,478,972 | 8/1949 | Luce | 411/347 X |
| 2,479,992 | 8/1949 | Woods | 24/221 K |
| 2,610,379 | 9/1952 | Bugg | 24/221 A |
| 2,640,244 | 6/1953 | Becker | 24/221 K |
| 2,640,245 | 6/1953 | Becker | 24/221 K |
| 3,124,993 | 3/1964 | Schlueter | 411/350 X |
| 3,360,910 | 1/1968 | Soltis | 411/350 X |

FOREIGN PATENT DOCUMENTS 822016 10/1959 United Kingdom ............... 411/554

Primary Examiner—Thomas J. Holko
Assistant Examiner—Adrian Whitcomb
Attorney, Agent, or Firm—Daniel H. Kane

[57] ABSTRACT

A quarter-turn fastener has a bolt having a head and a screw-threaded shank, and a retainer assembly threadably secured to the shank as a tight friction fit thereon. The retainer assembly has a pair of abutments for engagement with the rear of a support, through an aperture in which the retainer assembly locates in use. The retainer assembly includes at least one pair of stops for engagement with the sides of the aperture in the support or a corresponding aperture in a panel in which the fastener is mounted in use, to define the inoperative and operative positions of the retainer assembly. A compression spring is located in use between the retainer assembly and an opposed surface of the panel to retain the retainer assembly in its inoperative position under the action of friction, when the retainer assembly is disengaged from the support.

4 Claims, 10 Drawing Figures

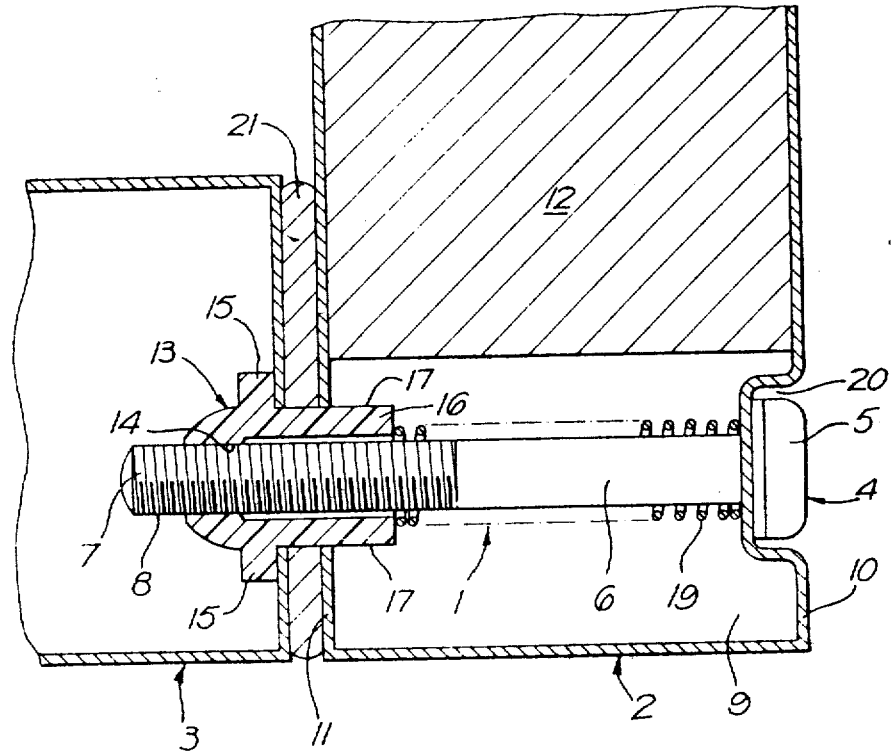

UNITED STATES PATENT AND TRADEMARK OFFICE
CERTIFICATE OF CORRECTION

PATENT NO. : 4,441,843
DATED : April 10, 1984
INVENTOR(S) : Andrew C. Wright et al It is certified that error appears in the above—identified patent and that said Letters Patent is hereby corrected as shown below:

The Title Page should appear as per attached Title Page.

Cancel Figs. 1-10 and substitute Figs. 1-5 as per attached Sheets.

In the Title Page, Column 2, last line, change "10" Drawing Figures" to -- 5 Drawing Figures --.

Signed and Sealed this

Twenty-fifth Day of March 1986

[SEAL]

Attest:

Attesting Officer

DONALD J. QUIGG

Commissioner of Patents and Trademarks

United States Patent [19]
Wright et al.

[11] 4,441,843
[45] Apr. 10, 1984

[54] ADJUSTABLE QUARTER-TURN FASTENER

[75] Inventors: Andrew C. W. Wright, Farnham; John W. Petruschke, Aldershot, both of England

[73] Assignee: Dzus Fastener Co., Inc., West Islip, N.Y.

[21] Appl. No.: 323,815

[22] Filed: Nov. 23, 1981

[51] Int. Cl.³ .............................................. F16B 21/02
[52] U.S. Cl. ................................................. 411/349
[58] Field of Search ................... 411/349, 350, 347; 24/221 R, 221 A, 221 K

[56] References Cited

U.S. PATENT DOCUMENTS

| D. 255,772 | 7/1980 | Johnson et al. | 24/221 A X |
|---|---|---|---|
| 2,385,180 | 9/1945 | Allen | 24/221 K |
| 2,478,972 | 8/1949 | Luce | 411/347 X |
| 2,479,992 | 8/1949 | Woods | 24/221 K |
| 2,610,379 | 9/1952 | Bugg | 24/221 A |
| 2,640,244 | 6/1953 | Becker | 24/221 K |
| 2,640,245 | 6/1953 | Becker | 24/221 K |
| 3,124,993 | 3/1964 | Schlueter | 411/350 X |
| 3,360,910 | 1/1968 | Soltis | 411/350 X |

FOREIGN PATENT DOCUMENTS 822016 10/1959 United Kingdom ................ 411/554

Primary Examiner—Thomas J. Holko
Assistant Examiner—Adrian Whitcomb
Attorney, Agent, or Firm—Daniel H. Kane

[57] ABSTRACT

A quarter-turn fastener has a bolt having a head and a screw-threaded shank, and a retainer assembly threadably secured to the shank as a tight friction fit thereon. The retainer assembly has a pair of abutments for engagement with the rear of a support, through an aperture in which the retainer assembly locates in use. The retainer assembly includes at least one pair of stops for engagement with the sides of the aperture in the support or a corresponding aperture in a panel in which the fastener is mounted in use, to define the inoperative and operative positions of the retainer assembly. A compression spring is located in use between the retainer assembly and an opposed surface of the panel to retain the retainer assembly in its inoperative position under the action of friction, when the retainer assembly is disengaged from the support.

4 Claims, 10 Drawing Figures